United States Patent
Koch et al.

(10) Patent No.: US 12,401,068 B2
(45) Date of Patent: Aug. 26, 2025

(54) ENERGY ACCUMULATOR AND MOTOR VEHICLE

(71) Applicant: PowerCo SE, Salzgitter (DE)

(72) Inventors: Stephan Leonhard Koch, Salzgitter (DE); Miriam Kunze, Seelze (DE)

(73) Assignee: PowerCo SE, Salzgitter (DE)

( * ) Notice: Subject to any disclaimer, the term of this patent is extended or adjusted under 35 U.S.C. 154(b) by 709 days.

(21) Appl. No.: 17/692,432

(22) Filed: Mar. 11, 2022

(65) Prior Publication Data

US 2022/0294033 A1    Sep. 15, 2022

(30) Foreign Application Priority Data

Mar. 12, 2021 (DE) .................. 10 2021 202 426.2

(51) Int. Cl.
*H01M 10/42* (2006.01)
*B60L 50/64* (2019.01)
*H01M 10/0525* (2010.01)

(52) U.S. Cl.
CPC ......... *H01M 10/4235* (2013.01); *B60L 50/64* (2019.02); *H01M 10/0525* (2013.01); *H01M 2220/20* (2013.01)

(58) Field of Classification Search
CPC .......... H01M 10/0525; H01M 2220/20; B60L 50/64; Y02E 60/10
See application file for complete search history.

(56) References Cited

U.S. PATENT DOCUMENTS

| | | | |
|---|---|---|---|
| 8,309,240 B1 * | 11/2012 | Li | H01M 10/0525 429/57 |
| 9,793,528 B2 | 10/2017 | Ka et al. | |
| 2014/0154533 A1 | 6/2014 | Schaefer et al. | |
| 2015/0093635 A1 | 4/2015 | Grimminger et al. | |
| 2017/0155103 A1 * | 6/2017 | Pasewald | A62C 3/06 |

FOREIGN PATENT DOCUMENTS

| | | |
|---|---|---|
| CN | 104769744 A | 7/2015 |
| DE | 10 2012 221 761 A1 | 6/2013 |
| DE | 102013112811 A1 | 5/2015 |
| EP | 0 814 531 B1 | 7/2005 |
| JP | 2013 98064 A | 5/2013 |

(Continued)

OTHER PUBLICATIONS

Search Report for German Application No. 10 2021 202 426.2, mailed Oct. 7, 2021.

(Continued)

*Primary Examiner* — Maria Laios
*Assistant Examiner* — Jade Serena Simmons
(74) *Attorney, Agent, or Firm* — PEARL COHEN ZEDEK LATZER BARATZ LLP

(57) ABSTRACT

An energy accumulator, in particular for a motor vehicle, has a secondary cell with two complementary electrodes, a separator spacing them apart, a cell housing which encloses the electrodes and the separator, and an electrolyte with which the cell housing is filled. In addition, hollow glass spheres are located within the cell housing, which are filled with a quantity of the electrolyte and/or an additive and which are in contact with the electrolyte accommodated in the cell housing.

12 Claims, 1 Drawing Sheet

(56) References Cited

FOREIGN PATENT DOCUMENTS

KR          20170103492 A          9/2018

OTHER PUBLICATIONS

Zhang et al. "Superior Conductive Solid-like Electrolytes: Nanoconfining Liquids within the Hollow Structures", Nano Letters, vol. 15, No. 5, 6, Apr. 6, 2015, pp. 3398-3402, XP55963844, ISSN: 1530-6984, DOI: 10.1021/acs.nanolett.5b00739.
Cevik et al. "Sulfonated Hollow Silica Spheres as Electrolyte Store/Release Agents: High-Performance Supercapacitor Applications", Energy Technology, vol. 7, Nr. 10, Jul. 16, 2019, pp. 1900511 (1-9), XP55963849, DE, ISSN: 2194-4288, DOI: 10.1002/ente.201900511.
Search Report for European Patent Application No. 22159717.2, mailed Sep. 30, 2022.
Search Report for Chinese Application No. 202210238292.7, dated Mar. 5, 2025.

* cited by examiner

ENERGY ACCUMULATOR AND MOTOR VEHICLE

CROSS REFERENCE TO RELATED APPLICATION

This application claims priority from German Patent Application No. 10 2021 202 426.2, filed Mar. 12, 2021, which is hereby incorporated by reference in its entirety.

FIELD OF THE INVENTION

The invention relates to an energy accumulator, in particular an energy accumulator for a motor vehicle. The invention also relates to a motor vehicle having such an energy accumulator.

BACKGROUND OF THE INVENTION

Energy accumulators for motor vehicles, in particular for motor vehicles operated by electric motors (including those designed as plug-in hybrids), usually comprise at least one, but mostly a multiplicity of (in particular electrochemical) secondary cells, i.e., rechargeable battery cells. A plurality of these secondary cells is usually combined in a battery module and a plurality of battery modules is combined in a traction battery for increasing the retrievable power. In particular, lithium-based secondary cells, in particular lithium-ion cells ("Li-ion cells"), are used.

However, the secondary cells are subject to aging processes, in particular due to side reactions, which, among other things, can lead to a "loss" of Li ions. Since Li ions form the charge carriers within the secondary cell during the electrochemical reaction, such a loss is known to lead to reduced charge transport, which in turn leads to a—generally undesired—reduction in the electrical capacity and/or performance of the secondary cell.

The problem addressed by the invention is that of enabling delayed aging of an energy accumulator.

SUMMARY OF THE INVENTION

According to the invention, this problem is solved by an energy accumulator having the features as claimed. According to the invention, this problem is additionally solved by a motor vehicle having the features a claimed. Advantageous and partly separately inventive embodiments and developments of the invention are set out in the dependent claims and the following description.

The energy accumulator according to the invention is preferably used in or with a motor vehicle, in particular a land-based, wheel-bound motor vehicle. The energy accumulator has (in particular at least) one secondary cell with (at least) two mutually complementary electrodes (i.e., in particular an anode and a cathode), with a separator spacing apart said electrodes (i.e., in particular spatially separating them from one another) and with a cell housing enveloping the electrodes and the separator. In addition, the energy accumulator has an electrolyte which is preferably also part of the secondary cell and with which the cell housing is filled. In addition, the secondary cell has hollow glass spheres which are located within the cell housing, filled with a quantity of the electrolyte and/or an additive and—in particular with their outer surface—are in contact with the electrolyte accommodated in the cell housing.

The electrolyte is preferably a liquid, also called an electrolyte solution or liquid electrolyte.

The cell housing is optionally formed by a comparatively rigid sheet metal or by a foil laminate. The latter is particularly the case if the secondary cell forms a so-called "pouch cell."

The additive is preferably an additive for the electrolyte, which is used, for example, to increase its temperature resistance and/or to stem aging processes or the like.

The glass spheres preferably form a reservoir for an additional quantity of the electrolyte or the additive (optionally also for a plurality of additives), which allows the corresponding content to be made available with a time delay during operation of the secondary cell. This time-delayed provision preferably takes place as a result of damage to an (outer) wall of the glass spheres and the resulting escape of the content (i.e., the electrolyte or additive) into the "free" electrolyte of the secondary cell. In this way, an already aged electrolyte, for example, can be "refreshed" or "renewed" by adding additional lithium ions. The service life of the secondary cell can thus be extended and/or its aging can be delayed.

In a preferred embodiment, the wall of the hollow glass spheres is formed exclusively by a glass.

In a further preferred embodiment, the glass of the hollow glass spheres is selected such that it is, optionally completely, dissolved by a chemical reaction with the electrolyte. This has the advantage that such a chemical reaction can basically take place independently of the operating state of the secondary cell and/or its utilization and the point in time at which the content of the respective hollow glass sphere is released can thus be predetermined comparatively easily. In addition, the dissolution of the glass is often triggered by by-products that are formed during the operation of the secondary cell and (particularly in addition to the consumption of Li ions) also lead to cell aging, or at least to a reduction in performance. Due to their chemical reaction with the glass, these by-products can advantageously be "captured" (e.g., bound or converted) and cell aging can thus be slowed down and/or delayed.

By-products that frequently occur during the operation of a secondary cell are, for example, water and hydrofluoric acid (HF) which are formed in particular from a lithium salt (or possibly also from a plurality of different lithium salts, if present) of the electrolyte. The latter is particularly the case if traces of water are present in the electrolyte. Alternatively or also additionally, breakdown products of the electrolyte can also react with a hexafluorophosphate ($HF_6$) and release hydrofluoric acid in the process. As is well known, hydrofluoric acid can attack and dissolve glass.

In addition to the at least one organic solvent, the electrolyte contains at least one lithium salt (also called: "lithium conductive salt"). Such a lithium salt can be, for example, at least $LiAsF_6$, $LiClO_4$, $LiSbF_6$, $LiPtCl_6$, $Li(CF_3)SO_3$ (LiTf), LiC ($SO_2CF_3$)3, a phosphate-based lithium salt— e.g., $LiPF_6$, $LiPF_3(CF_3)_3$ (LiFAP) and $LiPF_4(C_2O_4)$ (LiT-FOB)—a borate-based lithium salt—e.g., $LiBF_4$, $LiB(C_2O_4)_2$ (LiBOB), $LiBF_2(C_2O_4)$ (LiDFOB), $LiB(C_2O_4)(C_3O_4)$ (LiMOB), $Li(C_2F_5BF_3)$ (LiFAB) and $Li_2B_{12}F_{i2}$ (LiDFB),L—and/or a lithium salt of sulfonylimides—e.g., $LiN(SO_2CF_3)_2$ (LiTFSI) and $LiN(SO_2C_2F_5)_2$ (LiBETI). A particularly preferred lithium conductive salt is $LiPF_6$ (lithium hexafluorophosphate) or mixtures thereof. Examples of solvents used are ethylene carbonate, propylene carbonate, diethyl carbonate, dimethyl carbonate, ethyl methyl carbonate, acetonitrile, glutaronitrile, adiponitrile, pimelonitrile, gamma-butyrolactone, gamma-valerolactone, dimethoxyethane, 1,3-dioxalane, methyl acetate and/or mixtures thereof.

For example, a tris(2,2,2-trifluoroethyl)phosphite (TTFP), a 1-methyl-2-pyrrolidinone, a fluorinated carbamate and/or a hexamethylphosphoramide can be used as additives.

In an expedient embodiment, the glass of the hollow glass spheres is, for example, a silicate glass, an aluminosilicate glass, a phosphorus silicate glass, a phosphate glass, a borate glass and/or a borosilicate glass.

In an advantageous embodiment, the wall of the hollow glass spheres is designed such that the wall is not completely, but only partially, dissolved by the chemical reaction described above. As a result, the content of the respective hollow glass sphere can escape at a specific point in time, but the sphere structure remains at least partially intact after the dissolution of soluble components of the wall. This "residual structure," e.g., in the form of a skeleton running through the soluble components in the initial state, can then advantageously continue to form a certain spatial supporting structure and, e.g., prevent a structural collapse of the elements of the secondary cell containing the hollow glass spheres (the latter in particular in the case of comparatively large hollow glass spheres). For this purpose, e.g., it is expedient if the glass hollow spheres are made from borosilicate glass. In this case, the silicate part is dissolved over time due to the reaction with the electrolyte (or the by-products described above), but the structures formed by boron remain "standing" in the form of the skeleton. Optionally, such a partial dissolution of the hollow glass spheres (and thus the remaining of the residual structure) can also be made possible by the combination of different glasses or a differently doped glass. For example, doping with boron or germanium causes different solubilities in the electrolyte, so that an inner sphere with one doping and an outer sphere surrounding it with the other doping can be provided.

In a further expedient embodiment, the duration of dissolution of the hollow glass spheres is predetermined by a selection of the wall thickness of the wall of the hollow glass spheres. In other words, the duration until the wall of the hollow glass spheres and thus in particular the hollow glass spheres themselves has or have dissolved, and therefore the point in time (or the period) of the release of the content, is predetermined by a suitable selection of the wall thickness. The reactivity of the glasses is also influenced by chemical prestressing, so that in an optional (additional or alternative) embodiment, the dissolution rate is predetermined by a corresponding chemical prestressing. For chemical prestressing, an ion exchange (small ions for large ions, or vice versa) is carried out in the glass by means of salt baths.

In an optional variant, hollow glass spheres with different wall thicknesses and/or different sizes, i.e., in particular different diameters, are used. As a result, the release of the content of the hollow glass spheres can advantageously be extended over a comparatively long period of time. It has been found that for this purpose, not every hollow glass sphere needs to deviate from the others, but a mixture of hollow glass spheres can be used which covers a predetermined range of different dimensions.

In an expedient variant, the wall thicknesses are in the range between 1 nanometer and 30 micrometers, in particular between 5 nanometers and 5 micrometers. The diameters of the hollow glass spheres are preferably in the range between 10 nanometers and 1 millimeter, in particular between 50 nanometers and 500 micrometers, preferably between 0.1 and 100 micrometers.

In a preferred embodiment, the hollow glass spheres are accommodated in a coating of the above-described separator and/or at least one inactive component of the secondary cell. Advantageously, a coating of the separator that is usually required anyway can be expanded by an additional benefit—namely as a carrier material for the hollow glass spheres. This is also advantageous with regard to an economical production, since no additional coating process is required. In the event that the hollow glass spheres are designed as described above such that a residual structure is retained, i.e., not chemically dissolved, a loss in thickness of the separator coating can also be avoided or at least reduced in this embodiment, so that the contact between the respective electrode and the separator is maintained.

In particular, such an inactive component is a wall of the cell housing (e.g., the sheet metal or the "pouch film" mentioned above) and/or an, in particular uncoated, portion of a current collector of the electrodes. This in turn has the advantage that an influencing of properties of the active components (in particular of the electrodes or of the separator) which may occur under certain circumstances can be avoided. In the event that the or each current collector is provided with the coating containing the hollow glass spheres, a contact region of the or the respective current collector should be kept free of the coating or at least electrically conductive for the subsequent galvanic contacting. For example, a mask is used for this purpose during the coating, which results in the corresponding contact region not being coated.

In principle, the hollow glass spheres can also be arranged in a coating of the electrodes. In this case, however, the risk of mechanical destruction of the hollow glass spheres during the manufacture of the electrodes, in particular during the calendering processes that are usually carried out, is comparatively high.

Furthermore, it would also be conceivable within the scope of the invention to embed the hollow glass spheres, for example, in the electrode material or other components themselves. In this case, however, there is a risk that, after the hollow glass spheres are dissolved, remaining empty spaces will lead to mechanical instability and/or reduced electrical activity.

Furthermore, the hollow glass spheres can—additionally or alternatively to the above-described embodiments—also be arranged in hollow spaces of the secondary cell that are present anyway, provided they are fluidically connected to the electrolyte. Such hollow spaces are, e.g., already present pores of the electrode or the respective electrodes which usually have porosities in the range from 20 to 30 vol %. Such pores have sizes (diameters) in particular in the range from 0.1 to 15 micrometers and are therefore at least to some extent within the range of the aforementioned diameters of the hollow glass spheres, so that the latter—at least their proportion in the corresponding diameter range—can also be introduced into these pores.

The motor vehicle according to the invention forms in particular the above-mentioned motor vehicle and comprises the energy accumulator described above. In expedient designs, the motor vehicle therefore has the same features as the energy accumulator described above. In addition, the motor vehicle also has the same advantages as the energy accumulator.

The conjunction "and/or" is to be understood herein and in the following such that the features linked by this conjunction can be formed both jointly and as alternatives to one another.

BRIEF DESCRIPTION OF THE DRAWINGS

In the following, embodiments of the invention are described in more detail with reference to the drawings, in which.

Corresponding parts are in all figures always denoted with the same reference signs.

DETAILED DESCRIPTION OF THE INVENTION

Figure 1:
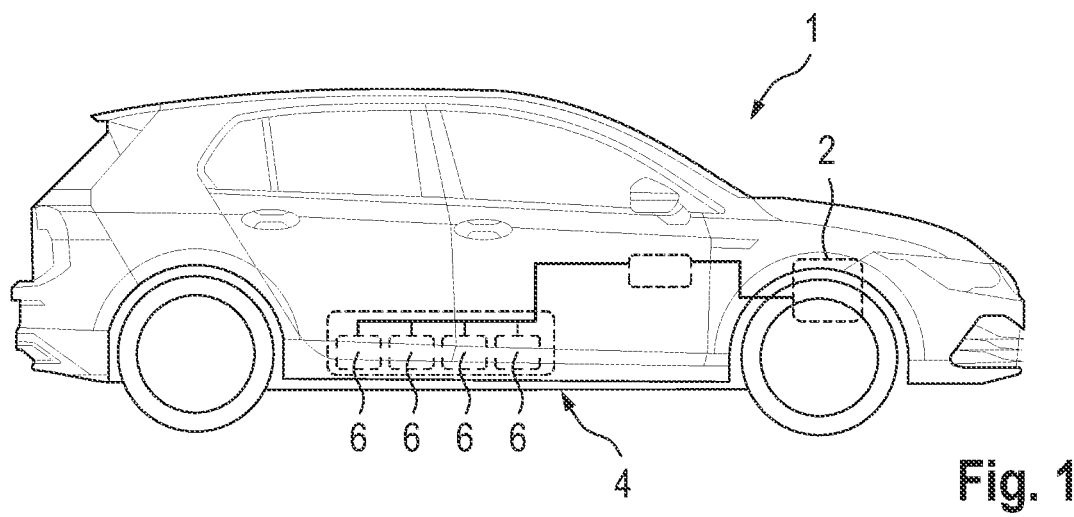
FIG. 1 shows a schematic representation of a motor vehicle driven by an electric motor having an energy accumulator.

In FIG. 1, a motor vehicle 1 is shown schematically. This motor vehicle 1 is a land-based, wheel-bound vehicle, specifically a passenger car. The motor vehicle 1 is driven by an electric motor and for this purpose has an electric motor 2 and a traction battery 4. The traction battery 4 in turn has a plurality of, in particular four, battery modules 6 which in turn have a multiplicity of secondary cells 8 (see FIG. 2). The traction battery 4 thus represents the energy accumulator of the motor vehicle 1.

Each secondary cell 8 has a cell housing (in short: housing 10) in which a number of paired electrodes 12 is arranged within an electrolyte solution 14, also called "electrolyte" for short. In the present embodiment, only one pair of electrodes 12 is shown. The secondary cell 8 also has a separator 16 which is arranged between the two electrodes 12 and spatially separates them from one another. In addition, a contact lug 18 (also called a "current collector") guided out of the housing 10 in a media-tight manner is also connected to each electrode 12.

In order to delay aging of the secondary cell 8 due to the consumption of lithium ions, each secondary cell 8 has a reservoir which is used for the delayed release of electrolyte. The reservoir is formed by a multiplicity of hollow glass spheres 20 which have enclosed in their interior a quantity of the electrolyte solution 14. The hollow glass spheres 20 are arranged in the secondary cell 8 such that the hollow glass spheres 20 are constantly in contact with the "free" electrolyte solution 14 accommodated in the housing 10. As a result, the glass of the hollow glass spheres 20 is disintegrated by the electrolyte solution 14 until a wall of the hollow glass spheres 20 (i.e., their glass shell) collapses, thus releasing the content.

In the depicted embodiment, the hollow glass spheres 20 are embedded in a coating (not shown) on the inner side of the housing 10 but such that there is contact with the electrolyte solution 14.

Figure 2:
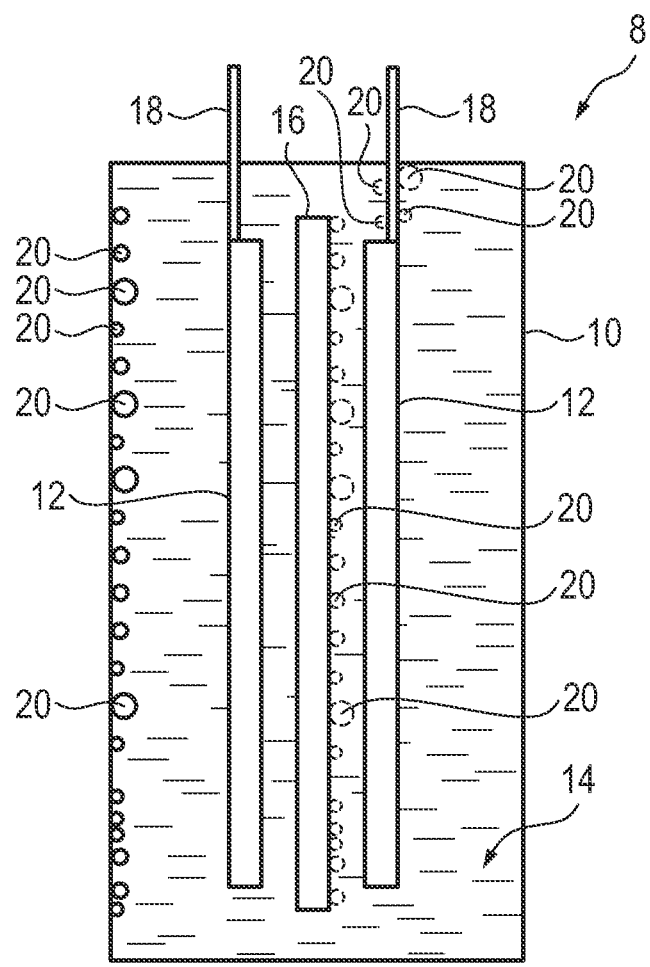
FIG. 2 is a schematic partial sectional view of a secondary cell of the energy accumulator of the motor vehicle.

In alternative or optionally additional embodiments—shown with dashed lines in FIG. 2—the hollow glass spheres 20 are embedded in a corresponding coating of the separator 16 and/or the contact lugs 18 (for the sake of clarity, only one side of the separator 16 and one contact lug 18 are shown).

In order to be able to specify the time at which the content of the hollow glass spheres 20 is released and thus the duration of their dissolution, a wall thickness of the hollow glass spheres 20 is selected to be correspondingly thick (large wall thickness value) or thin. In order to extend the release period for as long as possible, hollow glass spheres 20 with different wall thickness values are used. For clarification, the hollow glass spheres 20 in FIG. 2 are shown with different sizes.

The subject matter of the invention is not restricted to the embodiments described above. Instead, further embodiments of the invention can be derived by a person skilled in the art from the above description. In particular, the individual features of the invention and their design variants described with reference to the different embodiments can also be combined with one another in other ways.

LIST OF REFERENCE SIGNS

1 Motor vehicle
2 Electric motor
4 Traction battery
6 Battery module
8 Secondary cell
10 Housing
12 Electrode
14 Electrolyte solution
16 Separator
18 Contact lug
20 Hollow glass sphere

The invention claimed is:

1. An energy accumulator for a motor vehicle, comprising:
    a secondary cell with two complementary electrodes,
    a separator configured to space apart the complementary electrodes,
    a cell housing which encloses the complementary electrodes and the separator,
    an electrolyte with which the cell housing is filled, and
    at least two hollow glass spheres located within the cell housing, which hollow glass spheres are filled with a quantity of the electrolyte and/or an additive and which are in contact with the electrolyte accommodated in the cell housing,
    wherein the glass of the hollow glass spheres is selected such that it is dissolved by a chemical reaction with the electrolyte.

2. The energy accumulator according to claim 1, wherein one wall of the hollow glass spheres is formed exclusively by a glass.

3. The energy accumulator according to claim 1, wherein the glass used is a silicate glass, an aluminosilicate glass, a phosphorus silicate glass, a phosphate glass, a borate glass and/or a borosilicate glass.

4. The energy accumulator according to claim 3, wherein a wall of the hollow glass spheres is designed such that the wall is only partially dissolved by the chemical reaction, whereby a residual structure, which runs through the soluble components of the hollow glass spheres in the initial state, is retained after the soluble components have been dissolved.

5. The energy accumulator according to claim 3, wherein a duration of dissolution of the hollow glass spheres is predetermined by a selection of the wall thickness of the wall.

6. The energy accumulator according to claim 5, wherein hollow glass spheres with different wall thicknesses and/or different diameters are used.

7. The energy accumulator according to claim 5, wherein the hollow glass spheres have wall thicknesses in the range between 1 nanometer and 30 micrometers.

8. The energy accumulator according to claim 5, wherein the hollow glass spheres have wall thicknesses in the range between 5 nanometers and 5 micrometers.

9. The energy accumulator according to claim 3, wherein the glass is a silicate glass, an aluminosilicate glass, a phosphorus silicate glass, a phosphate glass, a borate glass and/or a borosilicate glass.

10. The energy accumulator according to claim 1, wherein the hollow glass spheres are accommodated in a coating of the separator and/or at least one inactive component of the secondary cell.

11. The energy accumulator according to claim 10, wherein the inactive component is a wall of the cell housing and/or a portion of a current collector of the electrodes.

12. A motor vehicle having an energy accumulator according to claim 1.

* * * * *